United States Patent [19]
Frey

[11] Patent Number: 5,296,078
[45] Date of Patent: Mar. 22, 1994

[54] WELD SEAM COVER ON THE INSIDE OF SHEET METAL TUBES

[76] Inventor: Ernst M. Frey, Lauenen 680 A, CH-3655 Sigriswil, Switzerland

[21] Appl. No.: 992,265

[22] Filed: Dec. 14, 1992

[30] Foreign Application Priority Data

Dec. 17, 1991 [CH] Switzerland .................. 03735/91

[51] Int. Cl.⁵ .................. B05B 13/06; B29D 23/00
[52] U.S. Cl. .................. 156/466; 156/203; 401/2; 118/317; 118/408; 413/72; 413/74
[58] Field of Search .................. 413/72-75, 413/34; 118/408, 317; 401/1-2; 156/203, 466

[56] References Cited

U.S. PATENT DOCUMENTS

| | | | |
|---|---|---|---|
| 3,077,171 | 2/1963 | Gotsch et al. | 118/317 |
| 3,118,406 | 1/1964 | Stanton | 228/30 |
| 3,526,027 | 9/1970 | Manuel et al. | 118/317 |
| 3,733,670 | 5/1973 | Troughton | 228/30 |
| 3,859,495 | 1/1975 | Takahashi et al. | 228/27 |
| 4,032,046 | 6/1977 | Elliot et al. | 401/1 |
| 4,180,011 | 12/1979 | Halicki | 118/317 |
| 4,353,326 | 10/1982 | Kolibas | 118/317 |
| 4,615,296 | 10/1986 | Kolibas | 118/317 |
| 4,759,946 | 7/1988 | Ribnitz | 118/317 |
| 4,781,482 | 11/1988 | Ursprung | 401/1 |
| 4,869,201 | 9/1989 | Takahashi et al. | 118/317 |

FOREIGN PATENT DOCUMENTS 59-78786  5/1984  Japan .

*Primary Examiner*—David A. Simmons
*Assistant Examiner*—Chester T. Barry
*Attorney, Agent, or Firm*—Bachman & LaPointe

[57] ABSTRACT

On the welding arm of a welding machine is mounted a coaxial application pipe with removable transport means and an application nozzle. Into this application pipe is fed a block-shaped hot-melt mass, in the direction opposite the advance direction of the sheet metal tube, guided in direction (V) of the application tube, melted in the area of a narrowing heater, passed through a supply tube to the application nozzle and applied or sprayed as a hot-melt strip to the inside of the longitudinal weld seam of sheet metal tubes.

The application of a hot-melt strip is suitable in particular for the protection of the longitudinal seam of a tin-plated can shell.

10 Claims, 4 Drawing Sheets

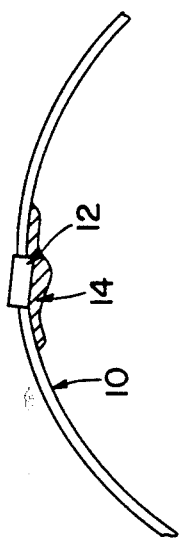
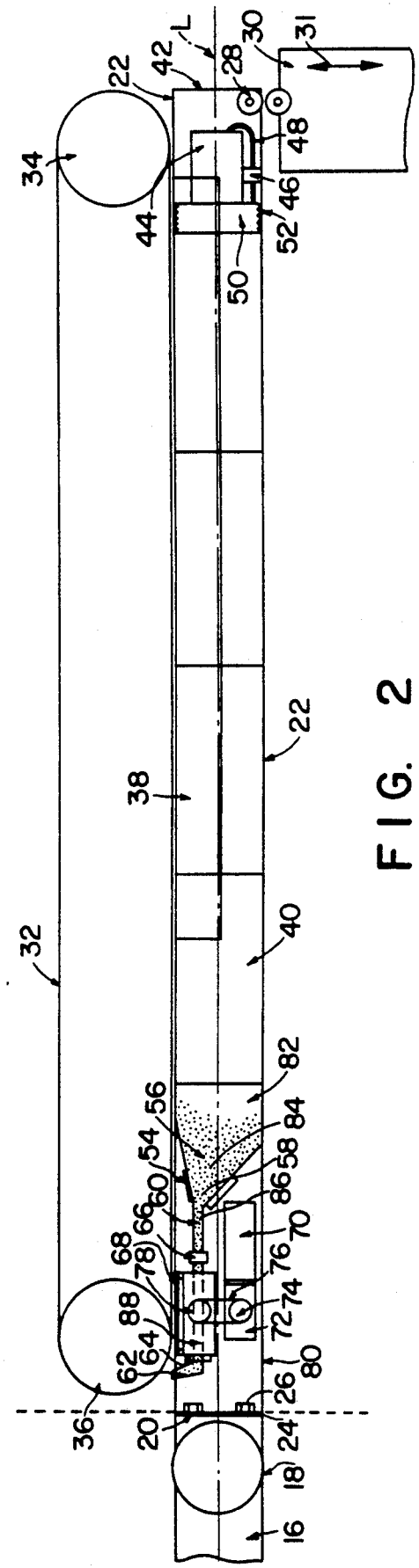
FIG. 1
FIG. 2

WELD SEAM COVER ON THE INSIDE OF SHEET METAL TUBES

FIELD OF THE INVENTION

The invention relates to a device for the continuous application of a protective layer to cover the inside of a longitudinal weld seam on sheet metal tubes using a welding machine with an inner welding roller arranged on a welding arm, an application arm running coaxially to the welding arm, removable means for transporting in an axial direction the sheet metal tubes which lie end to end and an application device surrounding a nozzle for the protective layer. The invention also relates to a process for operation of the device and an application of the process.

BACKGROUND TO THE INVENTION

Welding machines are known which have an "in line" application system which applies a protective strip to the inner longitudinal weld seam of sheet metal tubes, in particular longitudinally welded tin and can shells. In principle a distinction is made between the spraying of a paint and the application of a powder which is melted in situ into an adhesive layer.

DISCLOSURE OF THE PRIOR ART

Depending on the machine type, the paint is applied at the top or bottom, where the sheet metal tube is normally transported suspended on an application arm but standing on a conveyor belt for application in the lower region, in the longitudinal direction of the application arm.

In a first known variant, the paint is supplied through pipes of small diameter to spray nozzles under high pressure without air. In a second variant, the paint is atomized with an air flow.

In both known variants, the inner welding seam is covered with a wet paint, the dry layer is around 10 μm thick but relatively porous in comparison with a white inner coating. A disadvantage of the use of the known paint application devices is that the peaks of the spot and grid welding points are not covered with paint as this flows away.

In other known application devices on welding machines, the inner longitudinal weld seams of sheet metal tubes are protected by the application of a powder strip of even thickness which is melted in situ. The hardened layers are usually over 50 μm thick and essentially pore-free.

All paints and powders known to the specialist in this field can be used.

In particular for tin plate cans used in the food industry, a clean sterilization-stable inner cover of the weld seam is extremely important. The food-resistant nature also requires the protective layer to withstand hard mechanical processing such as the application of crimps or beading.

Attempts to apply sterilization-stable "hot-melts" as thermoplastic adhesives are known, which also resist mechanical loads, have previously failed in that they cannot be applied with the technical means suitable for the conditions.

STATEMENT OF THE INVENTION

The inventor has therefore set himself the task of creating a device of the type described initially and a process for its application which allow the use of hot-melts in a simple economic and efficient manner. All undesirable diffusion processes with a contained product, in particular food, should be avoided.

With regard to the device, the task is solved by the invention in that the application arm for introduction of a block-shaped hot-melt mass is tubular, with means for advancing and pressing the hot-melt mass in the direction of the welding arm with a forward and backward sliding insert, a heater which narrows in the feed direction, and a supply pipe for the supply to an interchangeable application nozzle adjacent to the welding arm. Special and further developed design forms of the device are the object of corresponding dependent claims.

The tubular application arm is connected at one end to the welding arm of the welding machine in a known manner and at the other end supported but preferably freely moving in the axial direction. This type of application arm is henceforth referred to as the application pipe.

The hot-melt mass introduced into the application pipe is block-shaped, where the blocks correspond at most to the internal cross-section of the application pipe. Corresponding to the usually circular internal crosssection, the hot-melt blocks are usually cylindrical. A large number of hot-melts are suitable for use according to the invention, food-resistant hot-melts in particular are interesting, such as those for example based on a polyester or epoxy resin.

The force for advancing and pressing the block-shaped hot-melt mass is suitably generated via a plate-shaped insert which corresponds in its external dimensions to the internal dimensions of the application pipe. The hot-melt blocks, also called candles because of their shape, can be pushed forward according to consumption by melting, where if necessary known rolling or pressing aids can be used. Blocks can be advanced with far lower force than for example a corresponding granulate which also has the disadvantage of too low a compactness.

The action of force of the insert on the hot-melt blocks is therefore always mechanical, whereas this insert itself can be activated by electromechanical, pneumatic or hydraulic means.

An insert with an external thread which engages in a corresponding thread on the inside of the application pipe must inevitably be circular. For feed with a spindle, in contrast to pneumatic or hydraulic means, in addition to the preferred circular internal cross-section of the application pipe, further cross-sections can be used, in particular rectangular or square. In this case the hot-melt blocks are correspondingly of quadrilateral section instead of cylindrical.

In technically simple solutions the hot-melt blocks are loaded discontinuously, the coating process must be interrupted every 1-2 hours when the stock of block-shaped hot-melt mass stored in the application pipe has been expelled by the insert. During a brief interruption to operation of for example one to two minutes:

the drive element with insert is withdrawn and removed from the application pipe, one long or several shorter hot-melt blocks are inserted and the insert and drive element repositioned, or a cover flush on the inside and outside and extending over the upper part of the periphery is removed, hot-melt blocks are inserted and pushed in the direction of the welding arm and the cover replaced. Obviously the insert must first be retracted, the can conveyor device folded away and the sheet metal tube blocking the cover removed.

With regard to the process for operating the device, the task is solved according to the invention in that the block-shaped hot-melt mass which runs against the advance direction of the sheet metal tube is fed through the application pipe, melted in the area of the narrowing heater, fed through the supply pipe to the application nozzle and applied or sprayed as a strip to the inside of the longitudinal weld seam. Special and further developed design forms are the object of dependent patent claims.

The feature essential to the invention, the advance of the block-shaped hot-melt mass from the opposite direction to the feed direction of the sheet metal tubes, helps the application of a hot-melt protective strip onto a longitudinal weld seam in a sheet metal tube become a breakthrough. This process is also open to more complicated technical solutions which allow a continuous or quasi-continuous operation concerning the insertion of hot-melt blocks into the application pipe.

The application of the internal protective strip can take place in the same manner at the top, bottom or side depending on the position of the application nozzle, the arrangement of the can transport device and for "in-line" welding machines, the alignment of the inner welding roller to the application nozzle. In practice, the hot-melt strip is most often applied at the top, so the sheet metal tubes are suspended on a welding arm of smaller diameter, the application pipe or at least an upper conveyor belt and are advanced in the axial direction.

The hot-melts used according to the invention preferably have a melting point in the range 100°-300° C., for food-resistant ones 200°-280° C. The heating sleeves, controlled by sensors, are brought to a corresponding temperature under program control.

The width of the hot-melt strip applied or sprayed on depends on the welding seam, and in practice lies in the range of 3 to 12 mm. The applied hot-melt strip hardens immediately, with the preferred layer thickness of 20 to 150 $\mu$m, in particular 20 to 50 $\mu$m; peaks created during welding cannot break through as is the case with the paintcoating process.

The time intervals of 1–2 hours necessary for refilling with hot-melt blocks can be extended by:
extending the application pipe which is normally 1.1–2.0 m long, and/or
applying a thinner layer.

A pump acting on the hot-melt mass in the supply pipe supports and increases the pressure generated by the drive element with insert. This can be the case in particular with a more viscous hot-melt, on application and/or with the use of longer application pipes. The pump can achieve pressures of for example 5 to 50 Pa, in particular 10 to 35 Pa.

The device according to the invention and the process for its operation have the advantage not previously achieved industrially for hot-melt masses that the application nozzle can be fitted adjacent to the welding roller. Therefore firstly the heat transferred from the welding roller to the sheet metal tube can be used, and secondly the weld seams of the sheet metal tube are still precisely aligned.

One particularly advantageous application of the process according to the invention lies in the application of a sterilization-stable hot-melt mass on the internal longitudinal weld seam of a tin-plate can shell. A layer is described as sterilization-stable if it remains unchanged when heated for example to around 130° C. for around 1 hour.

The invention not only allows hot-melt coating on new systems, but existing systems can be converted at low cost.

BRIEF DESCRIPTION OF THE DRAWINGS

The invention is explained in more detail using the design example shown in the drawing, which is also the object of dependent claims. The diagrams show:

FIG. 1: a partial cross-section through a sheet-metal tube in the area of the longitudinal welding seam FIG. 2: a partially cut view of a device for continuous application of a hot-melt protective strip

DETAILED DESCRIPTION OF THE PREFERRED EMBODIMENTS

Figure 3:
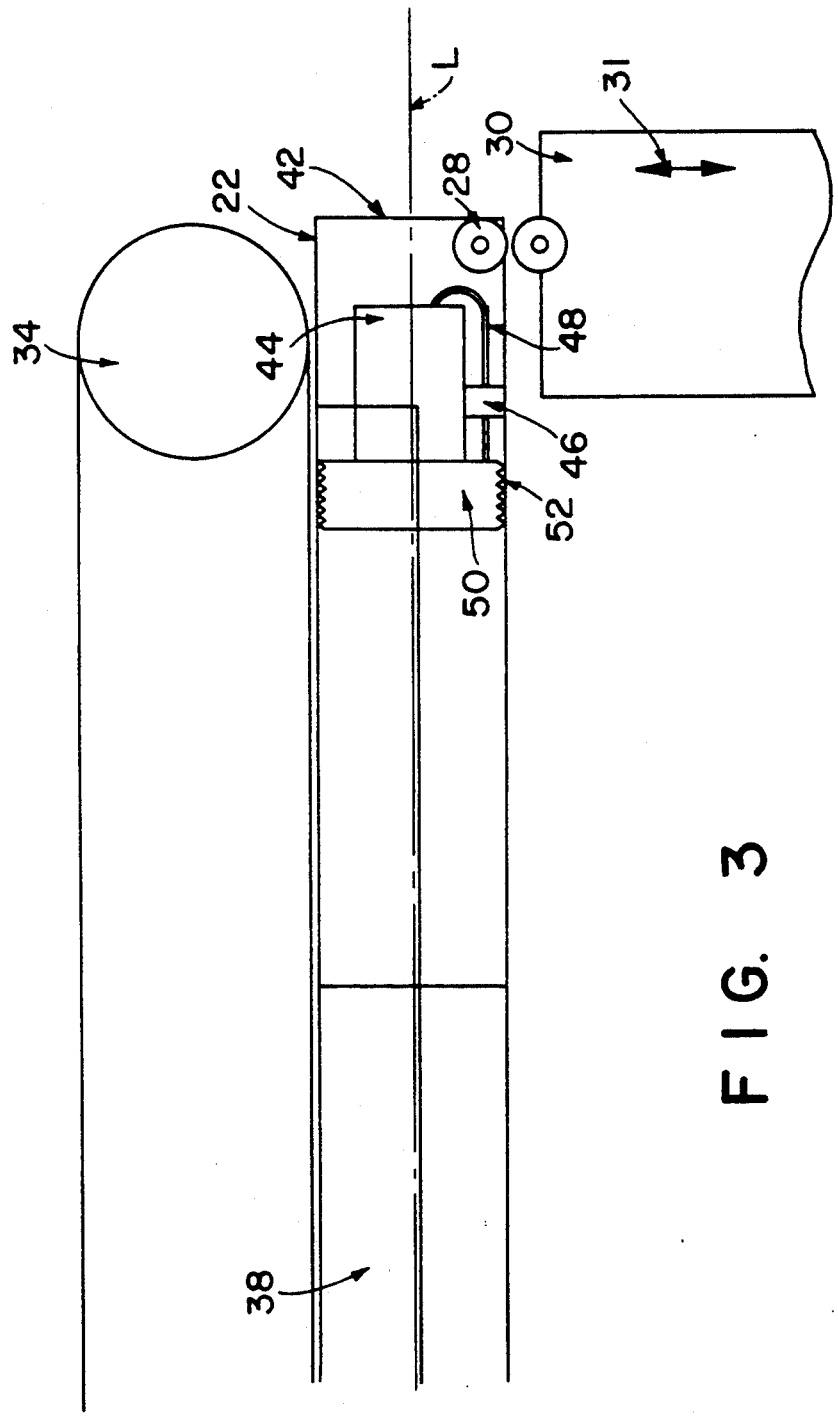
FIG. 3: the device according to FIG. 2 in the area of the drive element for the advance of the block-shaped hot-melt mass

The partially shown sheet metal tube 10 shown in FIG. 1 has a longitudinal weld seam 12 which is covered on the inside by a longitudinally running hot-melt strip 14 of a polyester.

In the device for continuous application of a hot-melt strip to cover the inside of a longitudinal welding seam in accordance with FIGS. 2–5, the sheet metal tubes lying end to end are not shown for reasons of clarity. On welding arm 16 of a conventional welding machine (not shown) is mounted an inner welding roller 18 in the area of the end 20. The welding arm 16 has for example a diameter of 60 mm, the slightly projecting inner welding roller 18 one of 62 mm. This welding arm is suitable in particular for welding sheet metal tubes of a diameter from 65 to 200 mm. The diameter of the sheet metal tube can therefore be slightly but also considerably larger than that of welding arm 16. For smaller or larger sheet metal tubes, a correspondingly adapted welding arm 16 can be used.

Connected coaxially and flush with welding arm 16 is an application arm consisting of a steel pipe which is therefore henceforth referred to as application pipe 22. The application pipe 22 with the same longitudinal axis L is attached with fixing means 24 to welding arm 16. The fixing means 24 are for example screws, rivets, an internal flange or a weld. The fixing means 24 shown in FIGS. 4 and 5 have a bore 26 for cable feed. At the other end, application pipe 22 is supported via ball-bearing rollers 28 on a stand 30. The stand 30 with expandable ball-bearing rollers 28 is adjustable in height according to the diameter of the sheet-metal tube, as is indicated by the double arrow 31. Stand 30 and ball-bearing rollers 28 can be adapted to the diameter of the sheet metal tube.

The sheet metal tubes 10, not shown, joined by the inner welding roller 18, run in-line onto the application pipe 22 where they are pushed further by an endless conveyor belt 32 which is guided by two deflecting rollers 34, 36, one of which is a drive roller. The conveyor belt 32 has a magnetic holder for the sheet metal tube and a variable drive. The transport device 32, 34, 36 can be folded upwards. Symmetrically in relation to the vertical, two transport devices 32, 34, 36 can be arranged on the two sides of the welding seam.

The application pipe 22 has a lid 38 which is flush externally and internally and extends over the upper half of the application pipe 22. For removal of the lid 38 covering part of the length of the application pipe 22, the removable means are first folded up with the conveyor belt 32 and the deflecting rollers 34, 36 and then the screws of the lid 38 are released. If the inner surface of the application pipe has an internal thread, the lid 38 has a corresponding thread.

With the lid 38 raised, block-shaped hot-melt masses 40, in the present case four approximately 20 cm long hot-melt blocks of diameter around 50 mm, can be inserted into the approximately 1.5 m long application pipe.

In the area of the open end 42 of the application pipe 22 is mounted a DC motor 44. A torsional support 46 which slides into an unseen longitudinal slot in the application pipe 22 also serves as a cable guide for the connection cable 48 of the DC motor 44.

By means of a conventional reducing gear, the DC motor 44 turns an insert 50 with an external thread 52 which in the present case is trapezoid in section. The inside of the application pipe 22 and the lid 38 have a corresponding thread, not shown.

A torque applied by the DC motor 44 exerts via the rotating insert 50 a feed force in the forward direction V on the inserted hot-melt blocks 40 and as they melt leads to an advance with adjustable application force.

Before the insertion of new hot-melt blocks 40 the DC motor 44 with insert 50 can be retracted at higher speed.

A heater 54, for example in the form of a sleeve, heating wires or heating strips, which narrows in the advance direction V of the hot-melt blocks 40 allows the hot-melt blocks 40 to soften in a melting zone 56. In the interior 58 of the heater 54 the hot-melt masses are completely liquefied and flow through the supply tube 60 to an interchangeable application nozzle 62 under the advance pressing force exerted by the DC motor 44 with the insert 50. The application nozzle 62 projects through an opening over the outer sleeve of the application pipe 22 to the same extent as the inner welding roller 18 projects over the outer sleeve of the welding arm 16.

Figure 4:
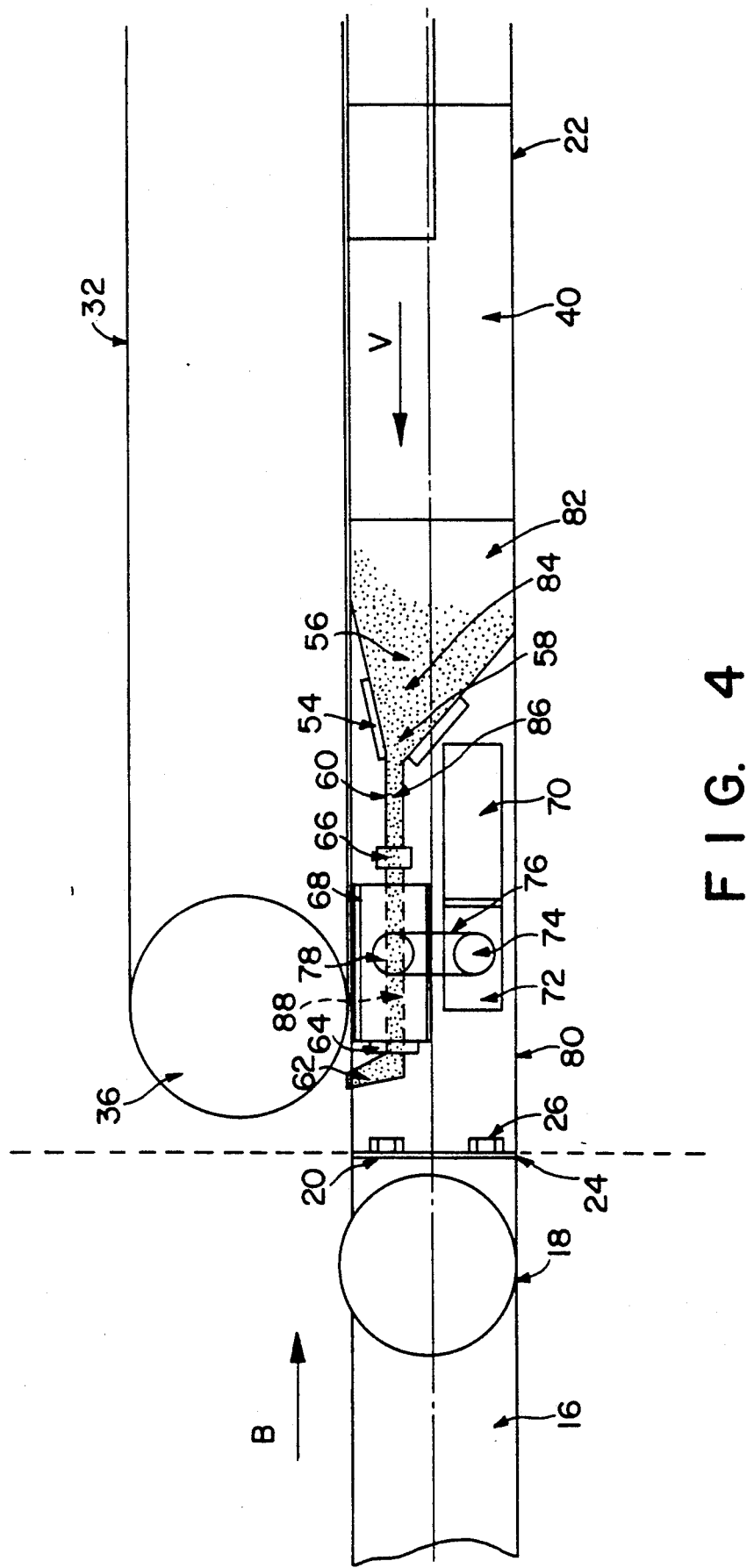
FIG. 4: the device according to FIG. 2 in the area of the application nozzle.

The application nozzle 62 is interchangeably mounted on a nozzle holder 64. It is designed conventionally for the application or spraying of the hot-melt mass 40. On application, the width of the hot-melt strip 14 covering the longitudinal weld seam 12 (FIG. 1) is determined by the length of the transverse slot. The output opening of the application nozzle 62 is formed according to the radius of the sheet metal tube guided in longitudinal direction L and is therefore interchangeable. On spraying the hot-melt mass 40, in addition to the shape of the application nozzle 62, its distance from the longitudinal weld seam is also decisive for the width of the hot-melt strip. With a spray nozzle, this does not project from the application pipe as shown in FIGS. 2 and 4.

The supply pipe 60 is passed via an interchangeable filter cartridge 66 through a second heater 68 to which is attached nozzle holder 64.

In the area of the second heater 68, an unseen mini-pump acts on the melted mass in the supply pipe 60 at a flow rate of 10 to 25 g/min with a pressure of 10 to 35 Pa (1 Pa=1000 millipascals). Such a mini-pump is not necessary if the hot-melt mass is sufficiently fluid and exerts sufficient pressure to be ejected from the application nozzle 62. The mini-pump is activated by a DC motor 70 with a gear 72 which acts via a drive wheel 74 and a toothed belt 76 on a pump wheel 78.

The DC motor 70 of the mini-pump is ventilated and cooled via an opening 80 in the lower area of application pipe 22. This opening 80 is also used for changing the application nozzle 62.

In the melting zone 56, in the intermediate area of the narrowing heater 54, in the supply pipe 60 and in the nozzle holder 64 is arranged in each case at least one measurement sensor 82, 84, 86, 88.

Figure 5:
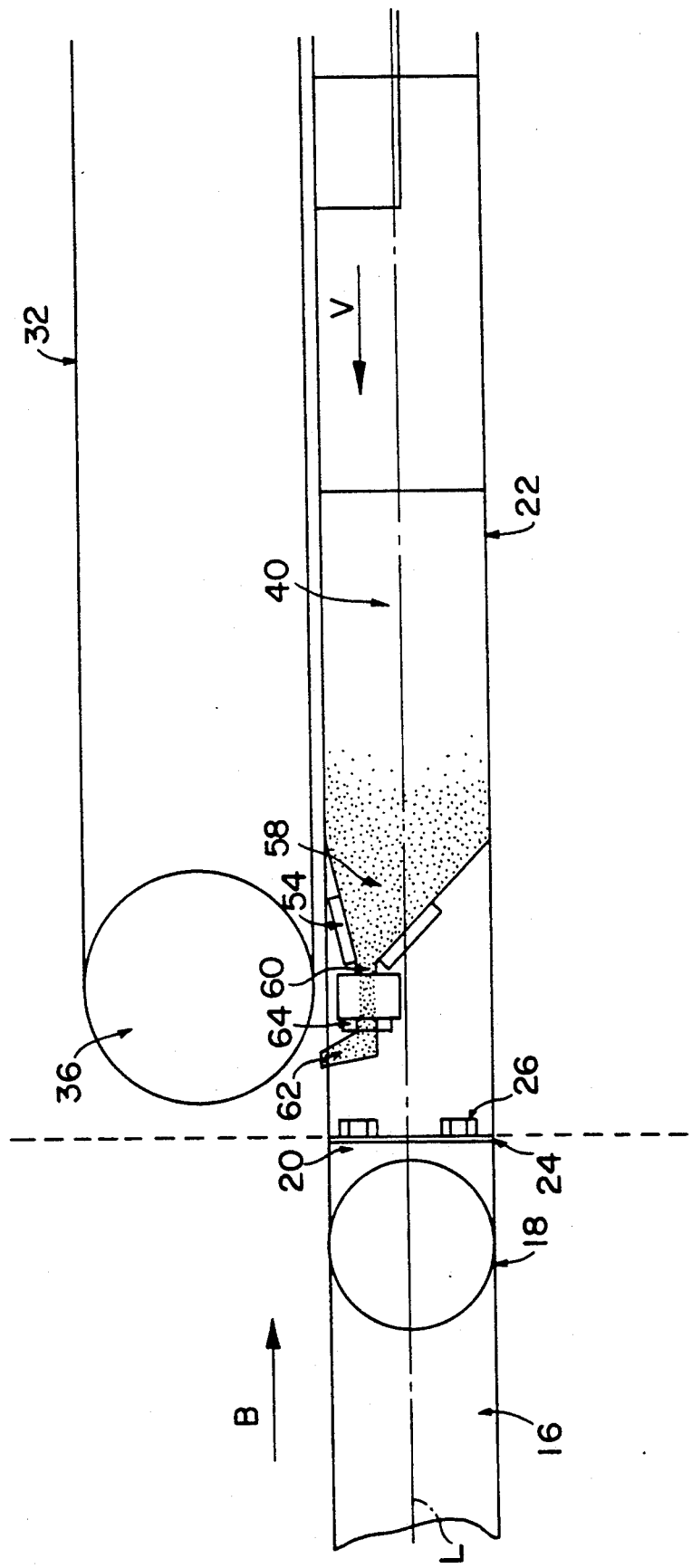
FIG. 5: a variant of FIG. 4.

In contrast to FIG. 4, FIG. 5 shows:
no filter cartridge 66, and
in the supply pipe 60, no mini-pump.

To improve the sliding characteristics of the block-shaped hot-melt mass 40, the application pipe 22 can be internally coated with Teflon and/or heated along at least part of its length.

I claim:

1. A welding machine device for the continuous application of a protective layer to cover the inside of a longitudinal weld seam of sheet metal tubes lying end to end comprising an inner welding roller arranged on a welding arm, an application arm running coaxially to the welding arm, removable means for transporting in an axial direction the sheet metal tubes lying end to end and an application device comprising a nozzle for the protective layer, characterized in that:
   the application arm providing for the introduction of a block-shaped block of hot-melt mass is tubular,
   means for advancing and pressing the hot-melt mass in an advance direction (V) towards the welding arm with a forward and backward moving insert,
   a heater which narrows in the advance direction (V),
   a supply tube is provided for supplying an interchangeable application nozzle arranged next to the welding arm.

2. Device according to claim 1, characterized in that to advance and press the block:
   the insert is designed as a threaded ring with external thread driven by an electric motor drive element, and the inside of the application pipe has a corresponding thread, or
   the insert runs on a spindle lying on the longitudinal axis of the application pipe and driven by an electric motor drive element, where the hot-melt block has a corresponding bore, or
   the insert is designed as a pneumatic piston driven by a drive element.

3. Device according to claim 2, characterized in that the insert and the drive element are interchangeably or removably inserted in the application pipe.

4. Device according to claim 1, characterized in that a removably fixed lid extending approximately over the upper half of the periphery of a part of the application pipe is provided, which closes internally fully flush and externally flush at least in the upper area.

5. Device according to claim 1, characterized in that around the supply pipe is arranged at least one further heater preferably in the form of a heating sleeve, a heating wire or a heating strip.

6. Device according to claim 1, characterized in that in the supply tube to the application nozzle is fitted a pump for the fluid hot-melt mass and an interchangeable filter cartridge.

7. Process for operation of the device according to claim 1, characterized in that the block-shaped hot-melt mass which runs opposite the advance direction of the sheet metal tubes, is guided in a direction (V) by the application tube, melted in the area of the narrowing heater, fed through the supply tube to the application nozzle and applied or sprayed as a hot-melt strip to the inside of the longitudinal weld seam of the sheet metal tubes.

8. Process according to claim 7, characterized in that the hot-melt mass is melted in the area of the narrowing heater at a temperature of 100°-300° C., held at this temperature in the supply pipe, and applied at a flow rate of 0.2 to 1.5 kg/h as a 20 to 150 μm, thick, 3 to 12 mm wide hot-melt strip.

9. Process according to claim 7, characterized in that the fluid hot-melt mass is passed at a pressure of 5 to 50 Pa, to the application nozzle by a pump incorporated in the supply pipe.

10. The process according to claim 7 wherein the hot melt mass is a sterilization-stable hot-melt strip and it is applied to the inner longitudinal weld seam of a tin-plate can shell.

* * * * *